United States Patent
Hales et al.

(10) Patent No.: US 9,963,345 B2
(45) Date of Patent: May 8, 2018

(54) NANOPARTICLE HYBRID COMPOSITES BY RF PLASMA SPRAY DEPOSITION

(71) Applicant: The United States of America as represented by the Administrator of the National Aeronautics and Space Administration, Washington, DC (US)

(72) Inventors: Stephen J. Hales, Poquoson, VA (US); Joel A. Alexa, Hampton, VA (US); Brian J. Jensen, Williamsburg, VA (US); Roberto J. Cano, Yorktown, VA (US); Peter T. Lillehei, Newport News, VA (US)

(73) Assignee: The United States of America as represented by the Administrator of NASA, Washington, DC (US)

( * ) Notice: Subject to any disclaimer, the term of this patent is extended or adjusted under 35 U.S.C. 154(b) by 125 days.

(21) Appl. No.: 14/211,508

(22) Filed: Mar. 14, 2014

(65) Prior Publication Data

US 2014/0272170 A1    Sep. 18, 2014

Related U.S. Application Data

(60) Provisional application No. 61/789,896, filed on Mar. 15, 2013.

(51) Int. Cl.
*C23C 4/10* (2016.01)
*C01B 21/064* (2006.01)

(52) U.S. Cl.
CPC ........ *C01B 21/064* (2013.01); *C01P 2004/13* (2013.01)

(58) Field of Classification Search
CPC ............ C23C 4/127; C23C 4/10; C23C 4/123
(Continued)

(56) References Cited

U.S. PATENT DOCUMENTS 6,106,659 A * 8/2000 Spence ................... B29C 59/14
                                                    118/723 E
2007/0266825 A1* 11/2007 Ripley .................. B01J 19/126
                                                    75/330

(Continued)

OTHER PUBLICATIONS

Curl, R.F., "Formation and Chemistry of the Fullerenes", Applied Superconductivity, vol. 1, Nos. 7-9, pp. 869-878, 1993.

(Continued)

*Primary Examiner* — Dah-Wei D Yuan
*Assistant Examiner* — Nga Leung V Law
(74) *Attorney, Agent, or Firm* — Jennifer L. Riley; Robin W. Edwards; Mark P. Dvorseak

(57) ABSTRACT

A method of fabricating a composite material includes utilizing a radio frequency plasma process to form a plasma plume comprising nanoparticles. The nanoparticles may comprise boron nitride nanoparticles, silicon carbide nanoparticles, beryllium oxide nanoparticles, or carbon nanoparticles. The nanoparticles may comprise nanotubes or other particles depending on the requirements of a particular application. The nanoparticles are deposited on a substrate by directing a plasma plume towards the substrate. The nanoparticles are formed in the plasma plume immediately prior to being deposited on the substrate. The nanoparticles may form a mechanical bond with the fibers in addition to a chemical bond in the absence of a catalyst. The substrate may comprise a fiber fabric that may optionally be coated with a thin layer of metal. Alternatively, the substrate may comprise a solid material such as a metal sheet or plate.

18 Claims, 4 Drawing Sheets

(58) Field of Classification Search
USPC .......................................... 427/455, 446, 456
See application file for complete search history.

(56) References Cited

U.S. PATENT DOCUMENTS

| | | | |
|---|---|---|---|
| 2007/0272153 A1* | 11/2007 | Hoshida ................. | B29C 59/14 118/718 |
| 2009/0004460 A1* | 1/2009 | Gruber ................... | B82Y 30/00 428/323 |
| 2011/0068291 A1* | 3/2011 | Park ...................... | B29C 70/882 252/62.54 |
| 2011/0070793 A1* | 3/2011 | Hales ..................... | B32B 5/26 442/76 |
| 2012/0003397 A1* | 1/2012 | Reniers .................. | C23C 4/02 427/576 |
| 2013/0064750 A1 | 3/2013 | Zettle | |

OTHER PUBLICATIONS

Homann, K-H , "Fullerenes and soot formation—new pathways to large particles in flames", AngewandteChemieInternational Edition,German Chemical Society, vol. 37, No. 18, pp. 2435-2537, 1998.

Fialkov, A.B., et al., Large Molecules, Ions, Radicals, and Small Soot Particles in Fuel-Rich Hydrocarbon Flames Part VI: Postitive Ions of Aliphatic and Aromatic Hydrocarbons in a Low-Pressure Premixed Flame of n-Butane and Oxygen, Combustion and Flame, vol. 127, pp. 2076-2090, 2001.

* cited by examiner

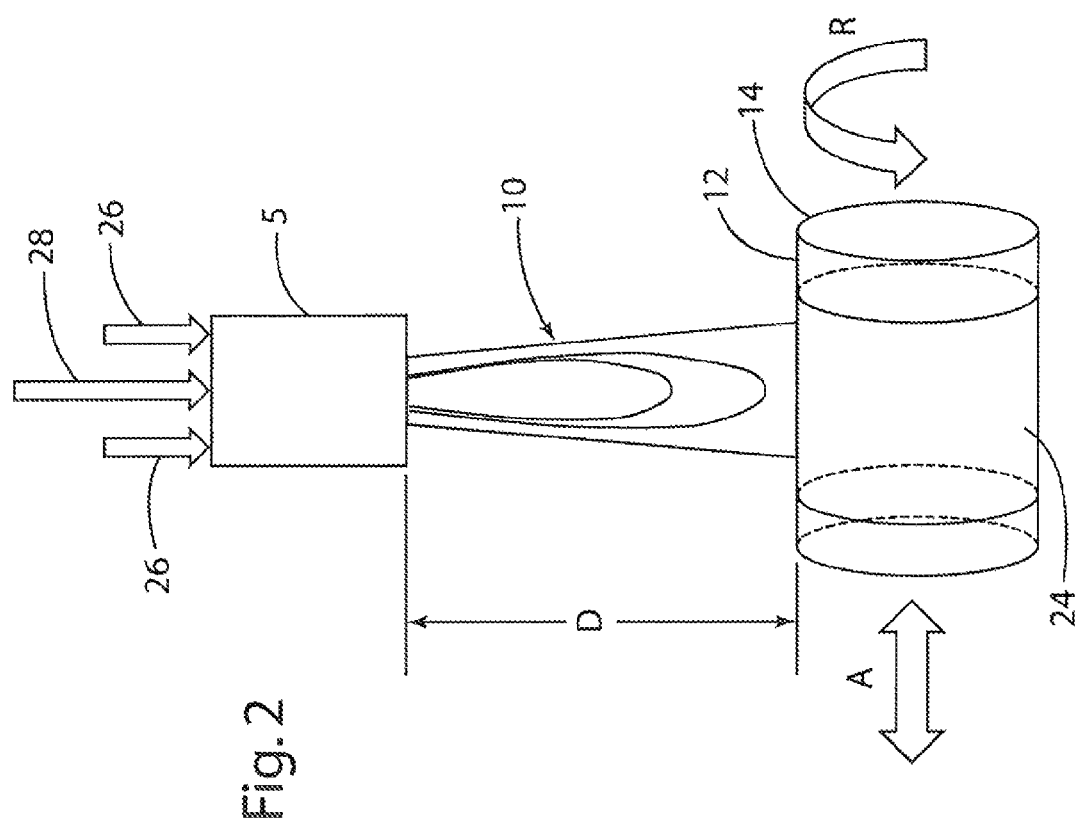

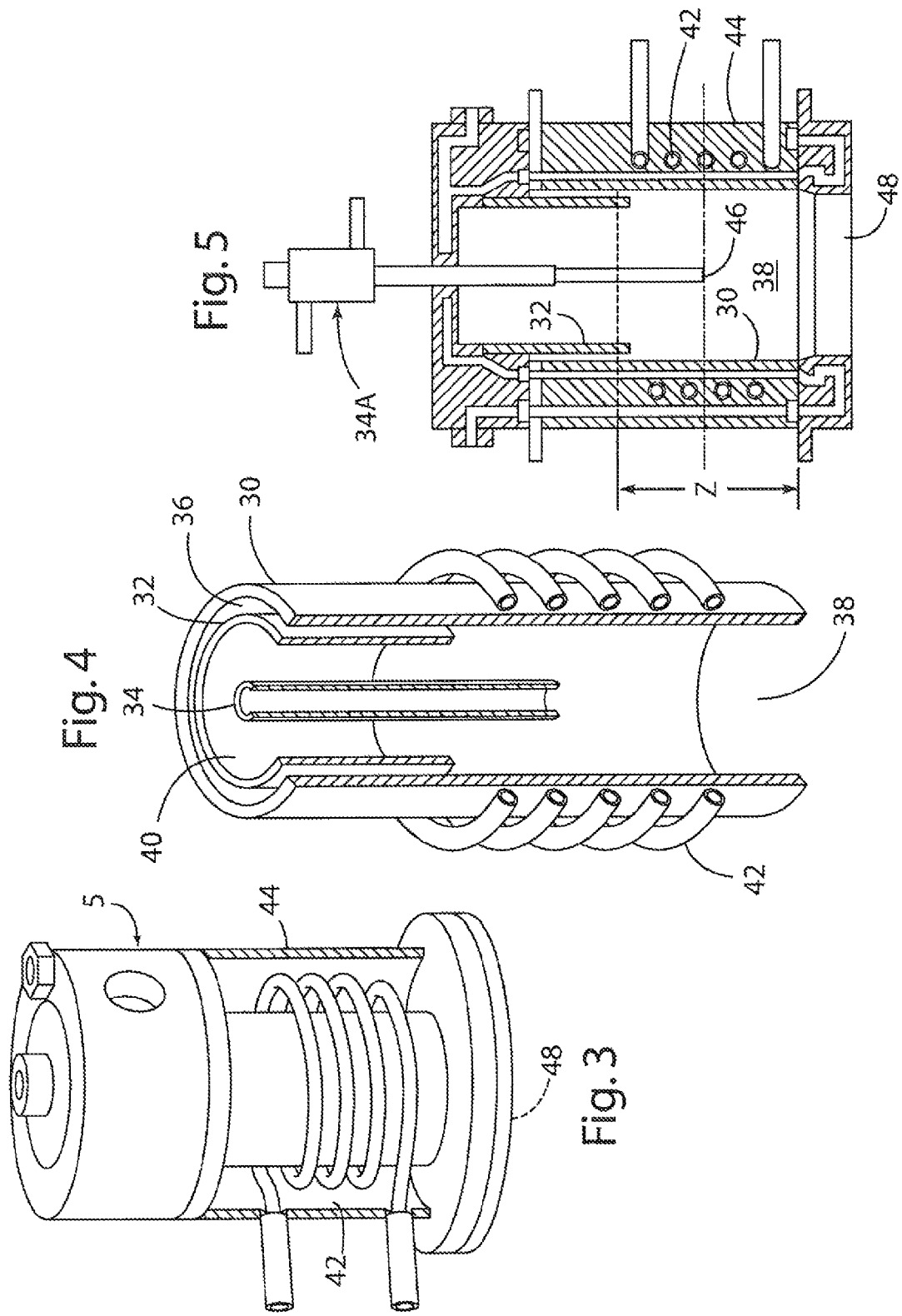

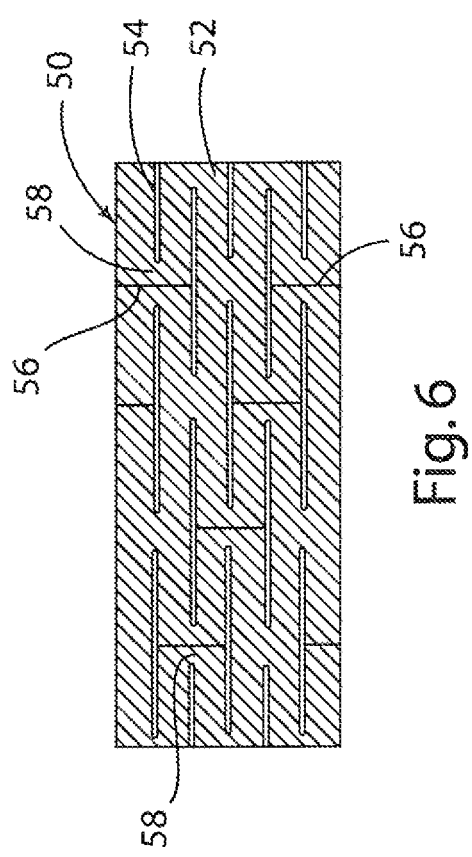

NANOPARTICLE HYBRID COMPOSITES BY RF PLASMA SPRAY DEPOSITION

CROSS-REFERENCE TO RELATED PATENT APPLICATION

This patent application claims the benefit of and priority to U.S. Provisional Patent Application No. 61/789,896, entitled "SYNTHESIS OF FIBER-METAL LAMINATES BY RF PLASMA SPRAY DEPOSITION" filed on Mar. 15, 2013, the contents of which are hereby incorporated by reference in their entirety.

STATEMENT REGARDING FEDERALLY SPONSORED RESEARCH OR DEVELOPMENT

The invention described herein was made in the performance of work under NASA contracts and by employees of the United States Government and is subject to the provisions of the National Aeronautics and Space Act, Public Law 111-314, § 3 (124 Stat. 3330, 51 U.S.C. Chapter 201) and 35 U.S.C. § 202, and may be manufactured and used by or for the Government for governmental purposes without the payment of any royalties thereon or therefore. In accordance with 35 U.S.C. § 202, the contractor elected not to retain title.

FIELD OF THE INVENTION

This invention relates to metal/composite laminates and the fabrication thereof. More specifically, the present invention includes utilizing a radio frequency ("RF") plasma spray process to synthesize nanoparticles and to deposit the nanoparticles on a substrate. The substrate can be utilized in a fiber-metal laminate.

BACKGROUND OF THE INVENTION

Metal/composite hybrid laminates provide a combination of structural and functional properties for a variety of applications such as aerospace structures. Metal/composite hybrid laminates may be prepared by compressing layers of metal sheets interleaved with layers of fibrous sheets that were previously impregnated with a resin. The layered structure may be placed in a mold prior to compression thereof.

A method of fabricating metal/composite hybrid laminates is disclosed in U.S. Pat. No. 7,595,112, the entire contents of which are incorporated herein by reference in its entirety. This process includes introducing liquid resin into a layered arrangement, and introducing a differential pressure across the laminate structure until the resin permeates the fibrous material of each layered arrangement. The resin is cured to thereby yield a metal/composite hybrid laminate.

U.S. Pat. Nos. 7,851,062 and 8,017,190, the entire contents of each are incorporated herein by reference in their entireties, disclose metal/fiber laminates and fabrication. The disclosed arrangement includes coating fibers with metal utilizing a low-pressure RF plasma spray deposition process. This may be utilized to form a thin layer of porous metal on fiber fabrics. A layered structure is formed, and liquid resin is infused through the layered structure to infuse the pores thereof.

BRIEF SUMMARY OF THE INVENTION

One aspect of the present invention is a method of fabricating a composite material. The method includes providing a fibrous material comprising a plurality of fibers. A radio frequency plasma process is utilized to form a plasma plume comprising nanoparticles. The nanoparticles may comprise boron nitride nanoparticles, silicon carbide nanoparticles, beryllium oxide nanoparticles, or carbon nanoparticles. The nanoparticles may comprise nanotubes or other particles depending on the requirements of a particular application. If the nanoparticles comprise nanotubes, the length of the nanotubes formed may be controlled by adjusting the parameters of the RF plasma spray deposition process to provide nanotubes having lengths that provide the mechanical properties required for a particular application. At least some of the nanoparticles are deposited on the fibrous material by directing a plasma plume towards the fibrous material. The nanoparticles are formed in the plasma plume immediately prior to being deposited on the fibrous material. The nanoparticles may form a mechanical bond with the fibers in addition to a chemical bond in the absence of a catalyst.

The RF plasma spray process may include use of a water cooled rotating mandrel that is positioned in a plasma spray chamber. Conventional fiber fabrics may be wrapped around the mandrel, and a plasma plume from an RF torch may be directed at the fiber fabric on the mandrel. The mandrel may be rotated and translated axially to thereby deposit the nanoparticles on the fiber fabric immediately after they are formed in the plasma plume. Long lengths of coated fabric can also be prepared by unrolling fabric from a drum, passing it under the RF plasma flume and re-rolling it on a second drum, forming an essentially continuous coated fabric.

The fibers of the fiber fabric may be coated with a porous metal utilizing the process described in U.S. Pat. Nos. 7,851,062 and 8,017,190. The fibers may be coated with the porous metal before the nanoparticles (e.g. nanotubes) are deposited on the fiber fabric such that the nanoparticles are deposited on the surface of the porous metal. Alternatively, the nanoparticles may be deposited directly on the fibers of the fiber fabric, and the resulting fiber fabric may then be coated with porous metal such that the nanoparticles are encased in the porous metal. According to one aspect of the present invention, combinations of nanoparticles and metals can be co-deposited through an injection probe as a mixture, or by multiple powder feeder methods.

One or more layers of the fiber fabric with nanoparticles may be formed into a laminate, and the laminate may be infused with a resin as disclosed in U.S. Pat. No. 7,595,112. The fabrics utilized in the laminate may include a layer of porous metal that is deposited on the fiber fabric as described above. Alternatively, one or more of the layers of fiber fabric may comprise a fiber fabric with nanoparticles deposited directly on the surfaces of the fibers, wherein the fibers are not coated with a thin layer of metal.

The resin utilized to permeate the layers of fiber fabric may have nanoparticles dispersed therein. For example, boron nitride nanotubes may be mixed into the liquid resin prior to infusion of the resin into the layers of fiber fabric material such that the nanoparticles are distributed throughout the resulting polymer matrix.

These and other features, advantages, and objects of the present invention will be further understood and appreciated by those skilled in the art by reference to the following specification, claims, and appended drawings.

BRIEF DESCRIPTION OF THE SEVERAL VIEWS OF THE DRAWINGS

FIG. 2 is a partially schematic view of a portion of the RF plasma spray system of FIG. 1;

FIG. 3 is a partially fragmentary isometric view of an RF plasma torch of the RF plasma spray system of FIG. 1;

FIG. 4 is a partially schematic fragmentary view of a portion of the plasma torch of FIG. 3;

FIG. 5 is a cross sectional view of a plasma torch including an adjustable height injection probe; and FIG. 6 is a schematic view of a metal matrix composite material according to one aspect of the present invention.

DETAILED DESCRIPTION OF THE INVENTION

Figure 1:
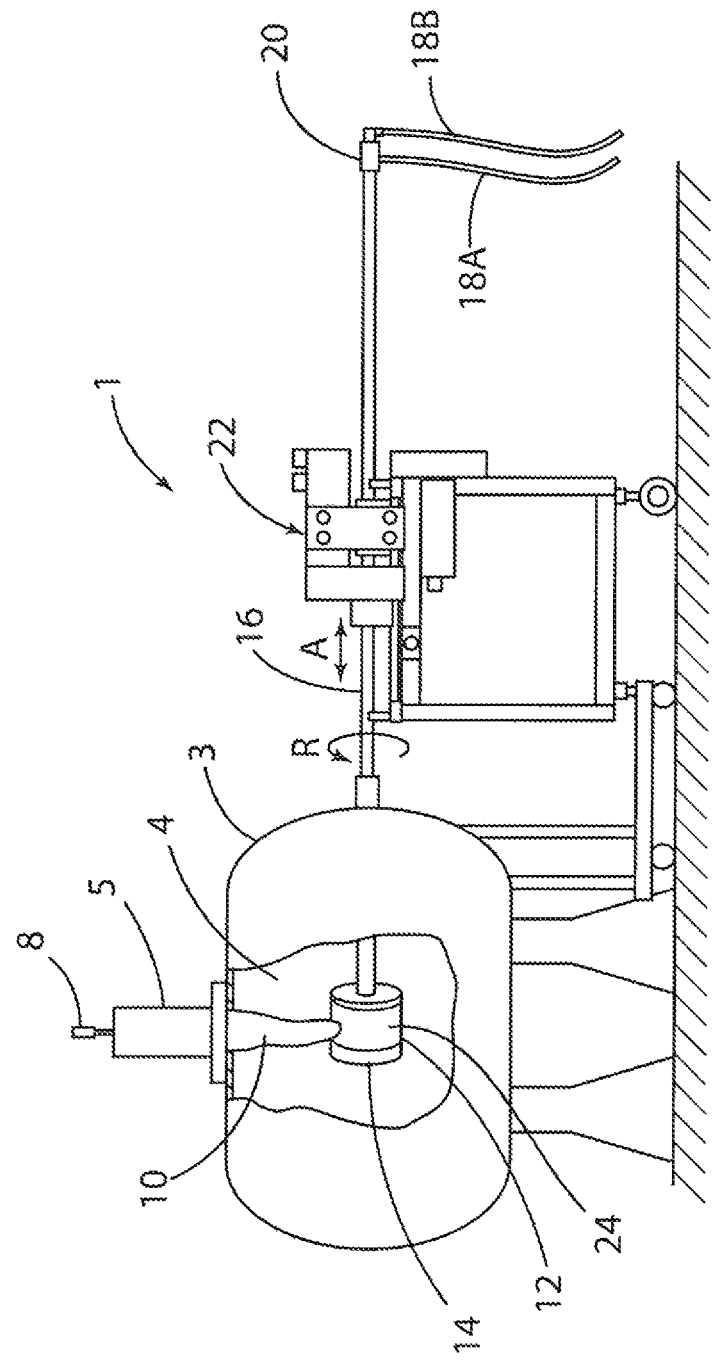
FIG. 1 is a partially schematic view of a radio frequency (RF) plasma spray system.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1 an RF plasma spray system 1 according to one aspect of the present invention includes a plasma spray vessel or containment vessel 3 having an interior space 4. An RF torch 5 and powder injector probe 8 generate a plasma plume 10 that is directed at a target or substrate 12 positioned within the interior space 4 of containment vessel 3. The target or substrate 12 may comprise a rotating and translating water-cooled mandrel 14 (see also FIG. 2) that is mounted on a rotating shaft 16. The rotating shaft 16 includes internal fluid passageways that circulate water utilizing water lines 18A and 18B and a rotary water cooling coupler 20. A device 22 causes the rotating shaft 16 and mandrel 14 to rotate as shown by the arrow "R." The device 22 also causes the shaft 16 to translate back and forth axially in a reciprocating manner as shown by the arrow "A." The device 22 may include an electric motor and programmable controller or the like (not specifically shown) to provide the desired rotational rate and axial movement of shaft 16 and mandrel 14. The mandrel 14 and shaft 16 may rotate at about 110 rpm to about 130 rpm, specifically about 120 rpm, and the mandrel 14 may translate axially at about 1 inch per second to about 3 inches per second, specifically about 2 inches per second. This causes the nanotubes to be deposited on to the substrate in a repetitive helical patter. However the rotational rate and axial movement of mandrel 14 and shaft 16 may vary depending on the requirements of a particular application.

A substrate 24 (see also FIG. 2) may be wrapped around the mandrel 14. The substrate 24 may comprise a conventional woven fiber material of the type previously utilized to form conventional composite materials. The substrate 24 may also comprise a fiber fabric or mat as disclosed in U.S. Pat. Nos. 7,851,062, 8,017,190 or U.S. Pat. No. 7,595,112. The substrate 24 may comprise a fiber material that has previously been coated with a thin layer of porous metal as described in the '062 and '190 patents. Alternatively, the substrate 24 may comprise a fiber fabric or mat that has not been coated with metal, such that the fibers of the fiber substrate 24 are exposed. If the fiber substrate 24 is not coated with metal, the fiber substrate 24 may comprise carbon fibers or virtually any type of fiber as required for a particular application. If the fiber substrate 24 is coated with metal (e.g. aluminum or titanium or alloys thereof), the fiber substrate 24 is preferably not a carbon fiber material to reduce or prevent galvanic interaction that could otherwise occur if carbon fibers were to be coated with a metal. In general, the substrate 24 may comprise a woven fabric material, an unwoven mat, or other fiber configuration (e.g. fibers wound on a mandrel 14 in a crisscross pattern). Substrate 24 may comprise fibers made of one or more materials as may be required for a particular application. Substrate 24 may alternatively comprise a metal sheet or plate, or other solid material.

Referring again to FIG. 2, plasma forming gasses 26 are supplied to the RF torch 5. The RF torch 5 may be similar to the plasma torch disclosed in United States Patent Publication No. 2012/0261390, the entire contents of which are incorporated herein by reference in its entirety. A mixture of carrier gas and powder 28 is also supplied to the RF torch 5. The RF torch 5 produces a plasma plume 10 that is directed towards the fiber substrate 24 on mandrel 14. Nanoparticles are formed in the plasma plume 10 and deposited onto the substrate 24. For example, the carrier gas and powder mixture 28 may comprise boron nitride powder that is mixed with a carrier gas such as helium, nitrogen or a mixture of gasses to thereby produce boron nitride nanotubes in plasma plume 10. The boron nitride nanotubes are then deposited directly onto the substrate 24 by the plasma plume 10. The flow rate of the plasma forming gas 26 and gas/powder mixture 28, the temperature, and other variables can be controlled to thereby produce nanoparticles of a desired size, morphology or quality. This may include a specific crystal structure or diameter, i.e. single- or multi-walled nanotubes. The quality is related to the purity of, and level of defects in, the nanotubes produced. The distance "D" between RF torch 5 and fiber substrate 24 can also be varied as required for a particular application to provide the desired nanoparticle spray pattern and velocity, and to facilitate bonding of the nanoparticles on substrate 24. This may include separation and alignment of nanotubes prior to deposition on the target or substrate 12. In general, the distance D is about 20 inches, and may be in a range of about 5 inches to about 35 inches.

The nanoparticles are deposited directly onto the fiber substrate 24, and mechanically and/or chemically bond to the fiber substrate 24. As discussed above, the fiber substrate 24 may be coated with metal, in which case the nanoparticles produced in plasma plume 10 are deposited on the metal surface of fiber substrate 24. Alternatively, if the fiber substrate 24 is not coated with metal, the nanoparticles produced in plasma plume 10 are deposited directly onto the fibers of the fiber substrate 24 and chemically and/or mechanically bond therewith. Although the substrate 24 is preferably a fiber fabric or the like, the substrate 24 may comprise other materials. For example, the substrate 24 could comprise a metal foil, sheet, or plate, or other solid (i.e. non-fibrous) materials. In cases such as this, the nanoparticles are deposited directly on the solid substrate.

Also, the RF plasma spray system 1 may be utilized to form boron nitride nanotubes for other applications. For example, a receiving container (not shown) may be positioned in the containment vessel 3 instead of mandrel 14. The container may be positioned such that boron nitride nanotubes formed in plasma plume 10 are deposited into the container. In general, the distance "D," temperature, pressure, and composition of the plasma plume 10 may be adjusted as required to form boron nitride nanotubes having the desired length and other properties. The container that collects the boron nitride nanotubes may be formed from a suitable material that is heat resistant, and has a surface that does not cause the boron nitride nanotubes to become bonded thereto. According to one aspect of the present invention, combinations of nanoparticles and metals can be co-deposited through the injection probe 34 as a mixture, or by multiple powder feeder methods.

With further reference to FIGS. 3 and 4, RF torch 5 may include an outer ceramic tube 30, an inner quartz tube 32, and an injection probe 34. The tubes 30 and 32 define an outer annular passageway 36 that transports a sheath gas into the chamber 38. The inner quartz tube 32 and injection probe 34 define an inner annular passageway 40 that transports a central gas to the chamber 38. The carrier gas and powder mixture is transported through the injection probe 34. Induction coils 42 heat the mixture of gas and powder in a known manner. In general, the sheath gas, central gas, and carrier gas may comprise argon, helium, nitrogen and hydrogen in any combination or concentration. However, the volume percentage of hydrogen is generally limited to about 6 percent. The carrier gas transports the powders axially into the center of the plasma, the central gas is utilized to create the plasma, and the carrier/central gas mixture governs the composition of the plasma. The sheath gas acts as a shroud to confine the very hot plasma and control the temperature of the RF torch 5.

With reference to FIG. 5, the RF torch 5 may include an adjustable height injection probe 34A having an outlet 46 that can be adjusted through a range of positions as shown by the dimension designated "Z." The RF torch 5 may include a housing 44 and nozzle 48.

With reference to FIG. 6, (not drawn to scale), a metal matrix composite material 50 according to one aspect of the present invention includes a metal matrix 52 and conventional fibers 54 dispersed in the metal matrix 52. The metal matrix material 52 may include boron nitride nanotubes (depicted by 56 in FIG. 6) that extend transversely through pores 58 in the fiber mat or fabric 54 to increase the inter-laminar shear strength. Delamination fracture is thereby impeded due to the presence of the transversely extending boron nitride nanotubes 56.

The composite material 50 may further include polymer matrix regions (not specifically shown). A composite material including a polymer matrix may be formed by coating a fiber substrate 24 with nanoparticles utilizing the process described above in connection with FIGS. 1-5. As discussed above, the nanoparticles may be deposited directly on the fiber substrate, or the fiber substrate may first be coated with a layer of porous metal. The metal coating may be formed before the nanoparticles are deposited onto the fiber substrate 24, or the metal layer may be formed after the nanoparticles are deposited onto the fiber substrate 24. Still further, the nanoparticles may be directly deposited on the fiber substrate 24 utilizing the RF plasma spray system 1, a thin layer of metal may then be deposited on the fiber substrate 24 utilizing an RF plasma spray process, and additional nanoparticles may then be deposited on the metal layer utilizing the RF plasma spray process. One or more layers of the fiber substrate 24 may then be utilized to form a laminate structure, and resin may be infused into the laminate utilizing the process described in U.S. Pat. No. 7,595,112. Nanoparticles (e.g. boron nitride nanotubes) may be mixed into the liquid resin before the resin is infused into the laminate structure, such that the resulting polymer matrix includes nanoparticles that are dispersed throughout the polymer matrix.

The RF plasma spray system 1 may be utilized to form carbon, boron nitride, silicon carbide, or beryllium oxide nanotubes. These nanotubes may be collected and utilized for other applications (e.g. mixing into resin utilized to form the polymer matrix). Alternatively, the nanotubes or other nanoparticles may be deposited on woven fabrics that may, optionally, be coated with metal. The type of nanotube required is application-dependent. For example, long nanotubes are preferable to short nanotubes for structural applications. This is akin to the choice of continuously (fiber) reinforced metal matrix composites, or discontinuously (whisker) reinforced metal matrix composites. However, single walled nanotubes are stronger than multi-walled nanotubes on a weight basis, but multi-walled nanotubes are stronger than single walled nanotubes on a volumetric basis. Given that the choice of nanotubes is application or function-specific, the RF plasma spray system 1 may be utilized to produce various types of nanotubes as required. In the case of fiber-metal laminates, the combination of conventional fibers and nanotubes can be arranged such that varying multi-axial property requirements can be addressed concurrently. From a structural materials perspective, this extends the two dimensional properties of fiber-metal laminate to three dimensions, i.e. in the Z or through-thickness direction, by enhancing the inter-laminar shear strength.

In general, the nanotubes formed in the plasma plume 10 may be deposited directly on a fiber substrate 24 in the absence of a catalyst.

Examples of fiber-metal laminates that may be formed utilizing the present invention include aluminum, titanium, copper, tantalum, nickel and/or chromium alloys that are deposited on metal foil and/or glass fiber fabric and/or carbon fiber fabric. The inherent porosity and other characteristics of the deposits facilitate consolidation utilizing non-autoclave processes such as vacuum-assisted resin transfer molding. Tailored lay-ups permit a suite of mechanical and physical properties to be obtainable in the final product.

It is to be understood that variations and modifications can be made on the aforementioned structure without departing from the concepts of the present invention, and further it is to be understood that such concepts are intended to be covered by the following claims unless these claims by their language expressly state otherwise.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

All ranges disclosed herein are inclusive of the endpoints, and the endpoints are independently combinable with each other. Each range disclosed herein constitutes a disclosure of any point or sub-range lying within the disclosed range.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." As used herein, the term "and/or" includes any and all combinations of one or more of the associated listed items. As also used herein, the term "combinations thereof" includes combinations having at least one of the associated listed items, wherein the combination can further include additional, like non-listed items. Further, the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

Reference throughout the specification to "another embodiment", "an embodiment", "exemplary embodiments", and so forth, means that a particular element (e.g., feature, structure, and/or characteristic) described in connection with the embodiment is included in at least one embodiment described herein, and can or cannot be present in other embodiments. In addition, it is to be understood that the described elements can be combined in any suitable manner in the various embodiments and are not limited to the specific combination in which they are discussed.

This written description uses examples to disclose the invention, including the best mode, and also to enable any person skilled in the art to make and use the invention. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A method of fabricating a laminate composite material with multi-axial mechanical properties, the method comprising:
   providing a fibrous material comprising a plurality of fibers forming a plurality of layers;
   at least partially coating the layers of fibrous material with a porous metal to form a porous arrangement of porous metal-coated fibers;
   utilizing a radio frequency plasma torch to form a plasma plume comprising nanoparticles, wherein the nanoparticles are produced in the plasma plume formed by the radio frequency plasma torch; and
   causing at least some of the nanoparticles to be deposited on the porous metal-coated fibers of the fibrous material by directing the plasma plume towards the fibrous material such that the at least some of the nanoparticles comprise nanotubes produced in the plasma plume formed by the radio frequency plasma torch that extend transverse to each layer and through pores of the porous arrangement of porous metal-coated fibers to increase the inter-laminar shear strength between the layers throughout a thickness of the laminate material.

2. The method of claim 1, wherein:
the fibrous material comprises a woven fabric.

3. The method of claim 1, wherein:
fibers in the fibrous material are selected from the group consisting of glass fibers, carbon fibers, graphite fibers, aramid fibers, polyethylene fibers, polybenzoxazole fibers, and any combinations thereof.

4. The method of claim 1, wherein:
the fibrous material is coated with the porous metal prior to depositing the nanoparticles on the fibrous material.

5. The method of claim 1, wherein:
the fibrous material is coated with the porous metal after depositing the nanoparticles on the fibrous material.

6. The method of claim 1, wherein:
the metal is selected from the group consisting aluminum, titanium, copper, tantalum, nickel, chromium, alloys thereof, and any combinations thereof.

7. The method of claim 1, wherein:
the fibrous material is coated with the porous metal utilizing radio frequency plasma spray deposition.

8. A method of fabricating a laminate composite material with multi-axial mechanical properties the method comprising:
   providing a fibrous material comprising a plurality of fibers forming a plurality of layers;
   at least partially coating the layers of fibrous material with a porous metal to form a porous arrangement of porous metal-coated fibers;
   utilizing a radio frequency plasma torch to form a plasma plume comprising nanoparticles, wherein the nanoparticles are produced in the plasma plume formed by the radio frequency plasma torch; and
   causing at least some of the nanoparticles to be deposited on the fibrous material by directing the plasma plume towards the fibrous material such that the least some of the nanoparticles comprise nanotubes produced in the plasma plume formed by the radio frequency plasma torch that extend transverse to each layer and through pores of the porous arrangement of porous metal-coated fibers to increase the inter-laminar shear strength between the layers throughout a thickness of the laminate material;
   infusing the fibrous material with a liquid resin material after at least some of the nanoparticles are deposited on the fibrous material; and
   curing the liquid resin to form a substantially solid matrix surrounding the fibrous material.

9. The method of claim 8, including:
dispersing a second set of nanoparticles in the resin prior to infusing the fibrous material with the liquid resin material.

10. The method of claim 9, wherein:
the second set of nanoparticles comprise boron nitride nanotubes.

11. The method of claim 1, wherein:
providing the fibrous material comprising the plurality of fibers forming the layer comprises providing the fibrous material comprising the plurality of fibers forming the layer on a mandrel.

12. The method of claim 11, further comprising:
moving the mandrel while causing the at least some of the nanoparticles to be deposited on the fibrous material by directing the plasma plume towards the fibrous material.

13. The method of claim 12, wherein:
moving the mandrel while causing the at least some of the nanoparticles to he deposited on the fibrous material by directing the plasma plume towards the fibrous material comprises rotating and translating the mandrel while causing the at least some of the nanoparticles to be deposited on the fibrous material by directing the plasma plume towards the fibrous material.

14. The method of claim 13, wherein:
the mandrel is rotated from 110 revolutions per minute to 130 revolutions per minute and translated from 1 inch per second to 3 inches per second.

15. The method of claim 14, wherein:
the mandrel is rotated at 120 revolutions per minute and translated at 2 inches per second.

16. The method of claim 13, wherein:
the mandrel is water-cooled.

17. The method of claim 1, further comprising:
providing a carrier gas and a powder to the radio frequency plasma torch, wherein the nanoparticles are produced from the carrier gas and the powder in the plasma plume formed by the radio frequency plasma torch.

18. The method of claim 17, wherein:
the powder comprises boron nitride powder.

* * * * *